(12) United States Patent
Westerdahl et al.

(10) Patent No.: US 9,056,415 B2
(45) Date of Patent: Jun. 16, 2015

(54) METHOD OF MANUFACTURE OF FILLETS FOR AIRCRAFT ASSEMBLIES OR THE LIKE AND A FORMING DEVICE

(75) Inventors: Anders Westerdahl, Linköping (SE); Ingemar Turesson, Linköping (SE); Eva Andersson, Linköping (SE); Per Linnerstedt, Sturefors (SE)

(73) Assignee: SAAB AB, Linköping (SE)

( * ) Notice: Subject to any disclaimer, the term of this patent is extended or adjusted under 35 U.S.C. 154(b) by 1772 days.

(21) Appl. No.: 11/466,772

(22) Filed: Aug. 24, 2006

(65) Prior Publication Data

US 2007/0194496 A1 Aug. 23, 2007

(30) Foreign Application Priority Data

Sep. 9, 2005 (EP) .................................. 05108294

(51) Int. Cl.

| | |
|---|---|
| B29C 33/40 | (2006.01) |
| B29C 43/40 | (2006.01) |
| B29C 43/02 | (2006.01) |
| B29C 43/36 | (2006.01) |
| B29C 69/00 | (2006.01) |
| B29D 99/00 | (2010.01) |
| B29C 33/00 | (2006.01) |
| B29C 47/00 | (2006.01) |
| B29L 31/00 | (2006.01) |
| B29K 105/08 | (2006.01) |

(52) U.S. Cl.
CPC ............. *B29C 43/40* (2013.01); *B29C 33/0022* (2013.01); *B29C 43/021* (2013.01); *B29C 43/36* (2013.01); *B29C 47/003* (2013.01); *B29C 47/0033* (2013.01); *B29C 47/004* (2013.01); *B29C 69/001* (2013.01); *B29C 2043/3623* (2013.01); *B29C 2043/403* (2013.01); *B29C 2793/009* (2013.01); *B29D 99/0014* (2013.01); *B29L 2031/003* (2013.01); *B29K 2105/0872* (2013.01)

(58) Field of Classification Search
USPC .......... 264/2.7, 239, 293, 299, 319, 320, 322, 264/337; 428/370
See application file for complete search history.

(56) References Cited

U.S. PATENT DOCUMENTS

| | | | | |
|---|---|---|---|---|
| 3,887,579 | A | * | 6/1975 | Brunet et al. ................. 264/316 |
| 4,161,503 | A | | 7/1979 | Foulkes et al. |
| 4,420,450 | A | * | 12/1983 | Marsh .......................... 264/118 |
| 5,277,052 | A | * | 1/1994 | Braunheim et al. ............ 72/414 |
| 5,419,245 | A | * | 5/1995 | Short ............................ 100/125 |
| 5,650,229 | A | * | 7/1997 | Gross et al. ................... 428/370 |

(Continued)

*Primary Examiner* — Richard Crispino
*Assistant Examiner* — Yana B Krinker
(74) *Attorney, Agent, or Firm* — Venable LLP; Eric J. Franklin

(57) ABSTRACT

A forming device and a method of manufacture of a fillet of plastic for aircraft assemblies. The fillet has a pre-determined profile for filling a cavity of a structural element. The fillet is formed using a former of a forming device. The method includes applying at least one blank of a base material of plastic between at least two opposed press beds of the former and at least one of the press beds including an elongated groove. At least one press bed is towards another press bed, until the press beds are in position for completed compression of the fillet. Each groove for forming of the fillet generates a fillet in correspondence with the pre-determined profile. The press beds are separated from each other for releasing the formed fillet. The formed fillet is removed from the former. The formed fillet is applied in the cavity.

10 Claims, 3 Drawing Sheets

(56) References Cited

U.S. PATENT DOCUMENTS

| | | |
|---|---|---|
| 6,192,966 B1 | 2/2001 | Yang |
| 6,454,893 B1 | 9/2002 | McKague, Jr. |
| 2006/0073626 A1* | 4/2006 | Shimizu et al. ........... 438/48 |

* cited by examiner

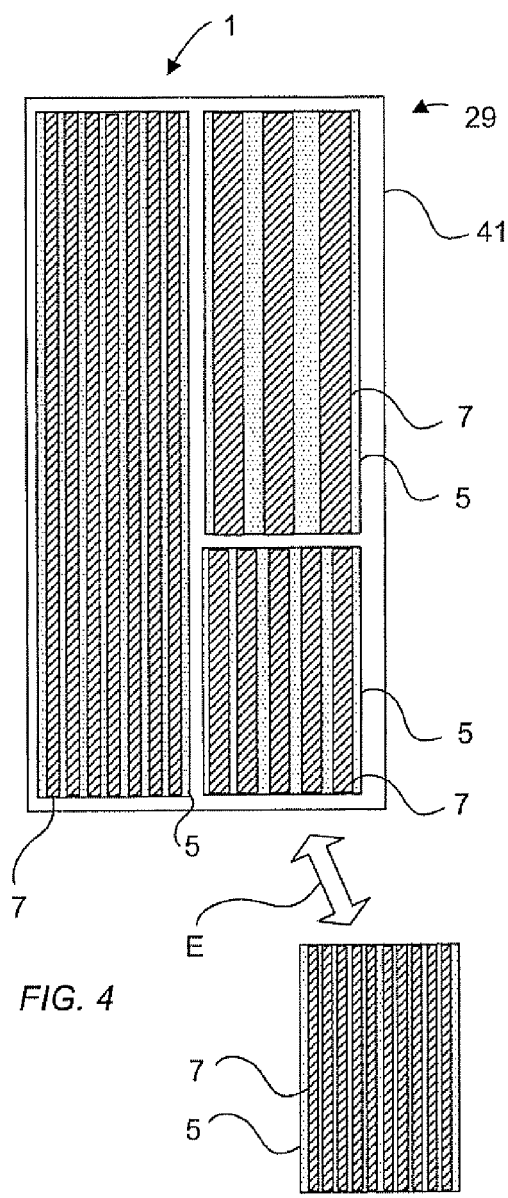
FIG. 4
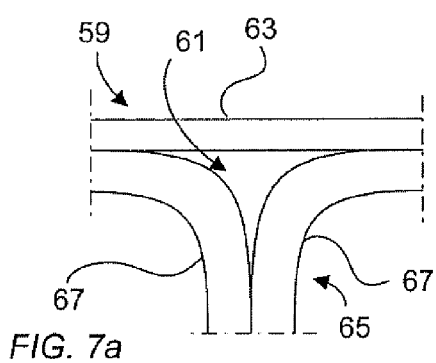
FIG. 7a
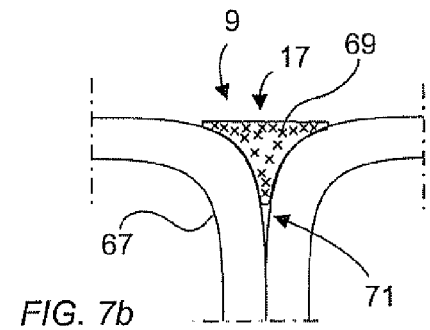
FIG. 7b
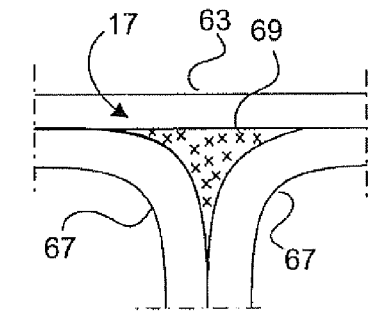
FIG. 7c
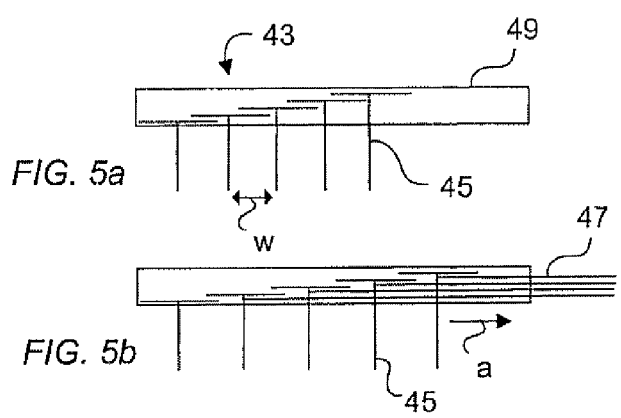
FIG. 5a
FIG. 5b
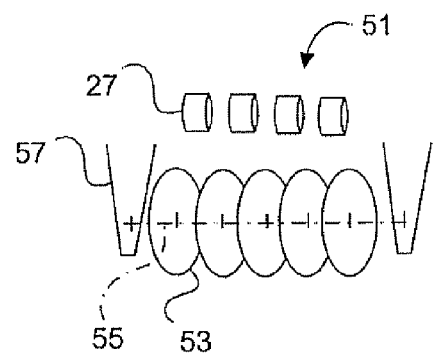
FIG. 6

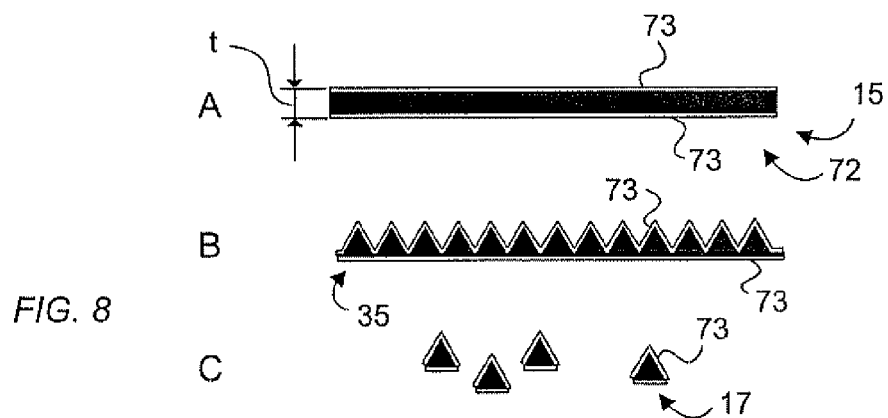
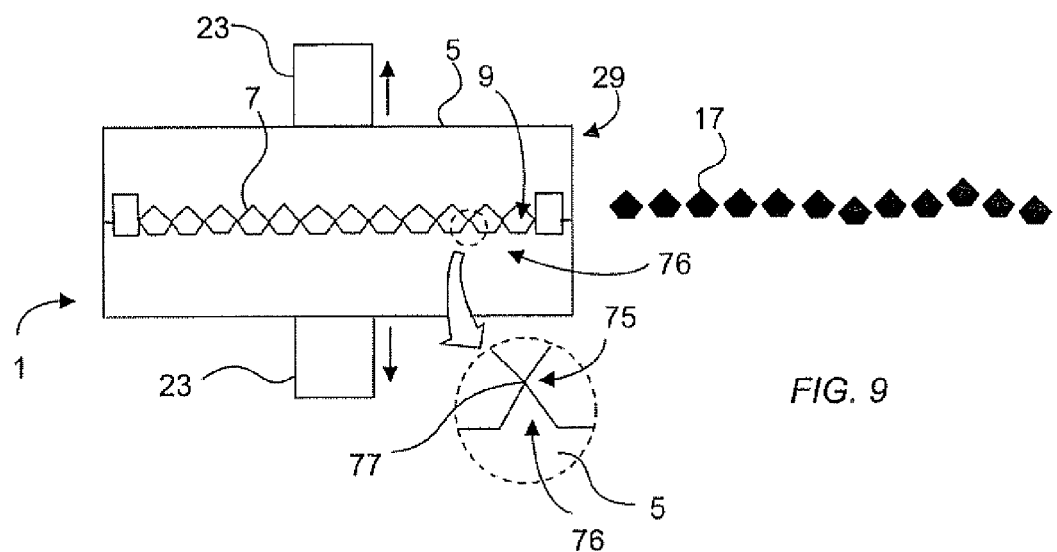
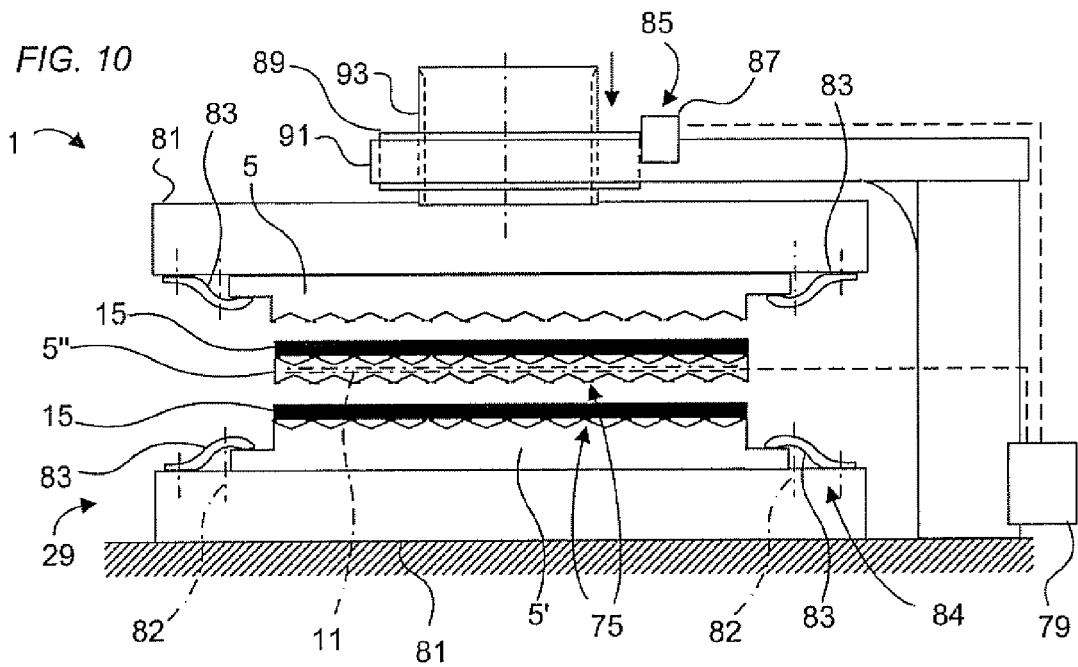

METHOD OF MANUFACTURE OF FILLETS FOR AIRCRAFT ASSEMBLIES OR THE LIKE AND A FORMING DEVICE

FIELD OF THE INVENTION

The present invention relates to a method of manufacture of a fillet of plastic, and to a forming device. The present invention relates, but not limited, to aircraft industry.

BACKGROUND OF THE INVENTION

In aircraft industry several methods exist today for providing narrow pieces of prepreg tapes. A prepreg tape is a form of composite material, wherein the resin is mixed with high-strength fibers and is partially cured. The narrow longitudinal pieces or so called fillets are, during assembly, filled in cavities formed in structural elements, junction plies, etc. (e.g. under panels applied onto a supporting structure of an aircraft's aileron, rudder, fuselage, wing etc.) for preventing deformation and/or weakening of the area near the cavity. Also plastic material fillets made of thermoplast or thermosetting resins exist made without any reinforcement elements therein.

The manufactory of fillets is today expensive and complicated. For example, U.S. Pat. No. 4,559,005 discloses a method of forming fillets by means of a machine with forming rolls rotated by a drive mechanism, the rolls having die grooves defining an orifice which shape corresponds to the cross-sectional shape of the fillet. Variable sized grooves of the rolls provide various sized fillets. The prepreg tape is fed into the machine through guide holes of the latter. The machine solves the problem related to time consuming and that little compaction is achieved by hand preparation of fillets.

Furthermore, U.S. Pat. No. 6,562,436 discloses a laminated fillet. Carbon fiber is oriented in different directions for providing increased structural properties. The profile of the fillet is cut out from the prepreg tape by means of an ultrasonic knife.

The object of the present invention is to overcome the drawbacks of known technique and to provide a solution alternative to hand preparation of fillets, which solution is non-expensive, simple, time saving and provides an user-friendly flexible module system.

SUMMARY OF THE INVENTION

This has been solved by a method being defined in the introduction.

Thereby a set of fillets can be provided in one uncomplicated working stage. Usage can be made of a simplified forming device, such as compression moulding press, often included in an assembly of machinery in the sphere of aircraft industry. The steps provide a fast, simple and cost-effective manufacturing method. The forming of the fillets can therefore be achieved in a effective manner regarding the controllability and abridged time of operation, thereby improving the JIT (just in time) management.

Alternatively, the press bed comprises at least two elongated grooves which are Adjacent to each other.

Thereby, a plurality of fillets can be made in one working operation.

Preferably, the blank of base material is heated by and heating means being of the forming means.

In this way the blank of base material for forming of fillets can be heated within the range of 20° C.-120° C., preferably 40° C.-100° C. In this way it is achieved that the plastic base material, such as phenolic, epoxy, polyester resin etc., rapidly and easily, and meantime maintaining its strength properties, will be formed into fillets. Also reinforcement fibers, such as carbon fibers, fiberglass uramid etc., of a blank of base material, will effectively become re-oriented during the compression. The heating of the blank of base material can preferably start when the blank is applied onto the heated press bed. Preferably, in connection thereto the compressing step begins immediately.

Suitably, the compressing step also includes, when the press beds being in position for completed compression of the fillets, mechanical separation of the fillets from each other.

In such a way the time of operation will be further shortened, since the fillets are ready to use directly after the compression/forming procedure.

Alternatively, the blank of base material is covered by protective foils.

Thereby the removal of the fillets from the press beds will be simplified. The fillets can be handled directly after the compressing step. If heat is delivered to the blank of base material comprising protective foils, a non adhesive handling of the fillets can be achieved. Likewise, an ID-marking can be provided onto the foils covering each particular fillet, which foils will be removed from the fillets when being applied in the cavities of the structural element of the aircraft. The ID-number is registered traditionally for each individual aircraft assembly.

Preferably, the step of removing the formed fillets from the press bed is followed by a step of mechanical separation of the fillets from each other.

Thereby a cake of interlinked fillets easily can be removed from the press bed for storage in a packing for further use later on in the production line. Such a cake or band of fillets is easy to handle. The fillets can easily be torn away from the cake one by one as desired.

Suitably, all the groove profiles in at least one press bed are identical.

In such a way a large amount of fillets with the same profile can be produced under a short time cycle.

Alternatively, the groove profiles in at least one press bed are not identical.

Thus, for a production of a small quantity of fillets with different profiles, such a press bed will be beneficial. The present forming device can easily and non-expensively be adapted for that kind of production. By just providing a machined press bed, with grooves having different cross sections, shaped for a particular small series fabrication of aircraft structural elements, a cost-effective method of manufacture of fillets is achieved.

Preferably, the step of removing the compressed formed fillet is followed by a step of changing at least one press bed to another press bed according to a modular system.

Thereby various series productions of all kinds of fillets having varying profiles can be performed cost-effectively by means of a rapid adjustment of the forming device at the same time as flexibility is achieved in a non-expensive manner.

This has also been solved by a forming device being defined in the introduction.

In such a way a simplified forming device for forming fillets is achieved, which device is non-expensive and easy to maintain and adaptable to specific production lines for production of fillets.

Alternatively, the press bed comprises at least two elongated grooves adjacent to each other.

Preferably, the forming means comprises a control means associated with a press bed driving means connected to the at least one press bed for controllable movement of the compressing operation.

Thereby different types of materials of plastic can be effected in different ways depending upon the thickness of the material (the thickness of the blank of base material is estimated and determined from the pre-determined height of the fillet), the type of plastic material and the type of reinforcement fibers provided thereto, if any.

Suitably, the forming means comprises heating means associated with a control means for controllable heating of the blank of base material.

Thereby it is achieved that the base material of plastic, such as phenolic, epoxy, polyester resin etc. still can be formed into fillets maintaining their strength properties, even if the room temperature is below the desired temperature for forming the base material.

Alternatively, the forming means comprises a separating means for mechanical separation of the fillets from each other.

Preferably, the separating means comprises sharp edges adjacent and along the elongated grooves of at least one press bed.

Thus, no further movable parts than the movable press bed have to be provided for the forming device for separating the fillets from each other and the separation can be performed in the same moment as the forming of the fillets, which is time-saving.

Alternatively, the at least one press bed is detachable fastened to the forming means by means of fastening means.

In such way a modular plastic base material forming device is provided for flexible production of fillets with different profiles.

BRIEF DESCRIPTION OF THE DRAWINGS

The present invention will now be described by means of the attached drawings, wherein FIG. 1 schematically in a perspective view illustrates a portion of a forming device;

FIG. 4 schematically in a planar view illustrates an example of a press table comprising various grooves of three different press beds for forming fillets according to a modular application;

FIGS. 5a, 5b and 6 schematically illustrate an adjustable separating means for mechanical separation of the fillets;

FIGS. 7a-7c schematically illustrate a cross section portion of a structural element dedicated an aircraft;

FIG. 8 schematically illustrates torn away fillets in a cross section from a cake comprising fillets;

FIG. 9 schematically illustrates a separating means being comprised in the press beds for mechanical separation of the fillets from each other; and FIG. 10 schematically illustrates a forming device according to a third embodiment.

DETAILED DESCRIPTION OF THE PREFERRED EMBODIMENTS

Hereinafter, embodiments of the present invention will be described in detail with reference to the attached drawings related to embodiments, wherein for the sake of clarity and understanding of the invention some details of no importance are deleted from the drawings.

Figure 1:
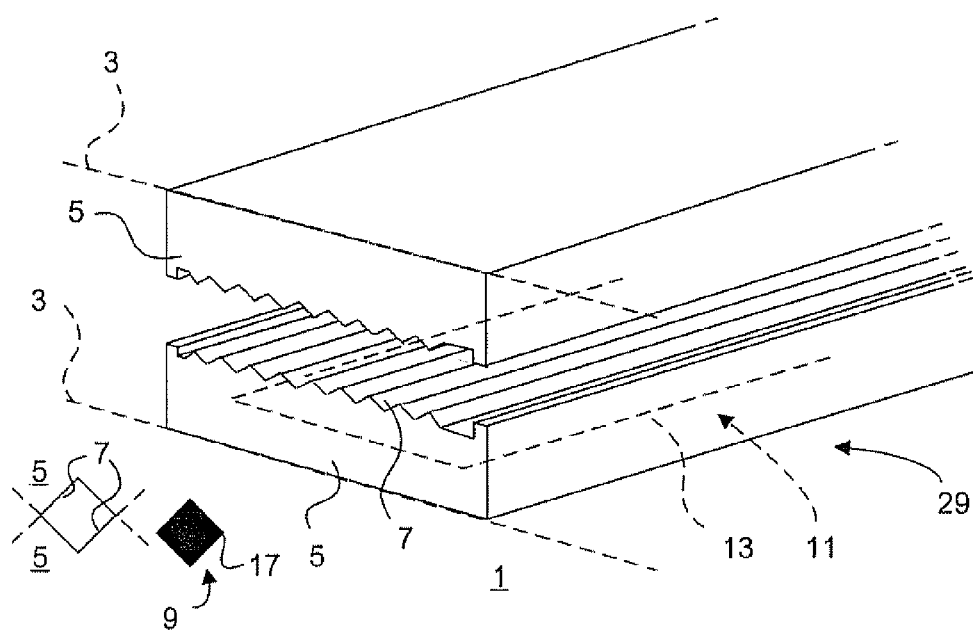

As shown in FIG. 1, a forming means 29, designed as a hydraulic press 3, includes two opposed press beds 5 mounted to the hydraulic press 3, each press bed 5 is provided with eight elongated grooves 7, adjacent to each other, for forming a blank of base material 15 of plastic (see FIG. 2a) into fillets 17 having optional cross section. The grooves 7 generate a fillet 17 in correspondence with the pre-determined profile 9 of the fillets 17, when the press beds 5 being in position for completed compression (see for example FIG. 2b). A heating means 11, in form of a heating coil 13, is arranged in the lower press bed 5. The compression and forming of fillets 17 is explained further below.

Figures 2A, 2B:
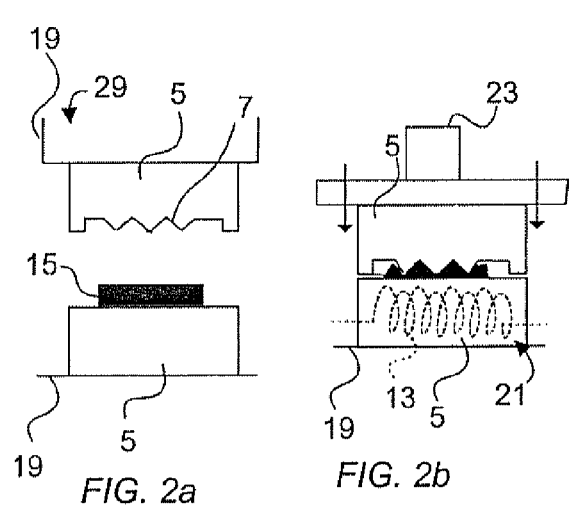
FIGS. 2a-2c schematically illustrate a procedure for manufacture of fillets according to an first embodiment.
Figure 2C:
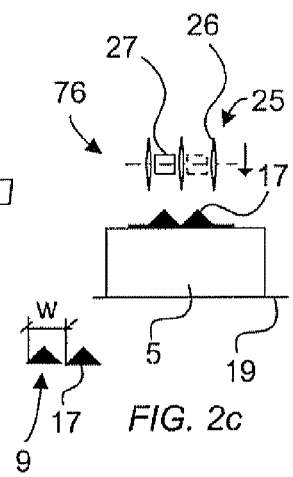

FIGS. 2a-2c illustrate, according to a first embodiment, a press 19 comprising two press beds 5, the upper having two, adjacent to each other, elongated grooves 7 for forming acute-angled triangles when the press beds 5 are in position for completed compression. The lower press bed 5 is also designed as a heating table 21 for heating the blank of base material 15. The fillets 17 are formed with an optional profile 9. In FIG. 2c the profile 9 of the fillet 17 corresponds to an acute-angled triangle shaping groove 7 of the upper press bed 5.

The blank of base material 15 is applied onto the lower press bed 5 and between the two opposed press beds 5. The heating table 21 (press bed) will heat the blank of base material 15 to a predetermined temperature, whereupon the upper press bed 5 is moved towards the lower press bed 5 until the press beds 5 are in position for completed compression (see FIG. 2b), wherein each groove 7, for forming the fillets 17, generates a fillet 17 in correspondence with the profile 9 of an acute-angled triangle.

The press beds 5 are then separated, by means of a press bed driving means 23, from each other for releasing (or exposing) the compress formed fillets 17. The fillets 17 are automatically linked to each other. For separating the fillets 17 from each other, they are cut apart by means of reel cutters 26 of a reel cutter arrangement 25 having distance sleeves 27. The distance sleeves 27 are changeable to sleeves with another length depending on the width w of the fillets 17. Thereafter the formed fillets 17 are removed from the forming means 29.

Figure 2D:
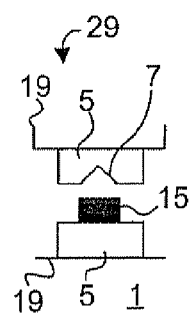
FIG. 2d schematically illustrates a forming device having a press bed including one groove.

FIG. 2d schematically illustrates a forming device 1 having a press bed 5 including one groove 7. In such way a separate fillet can be produced cost effectively in small series.

Figure 3:
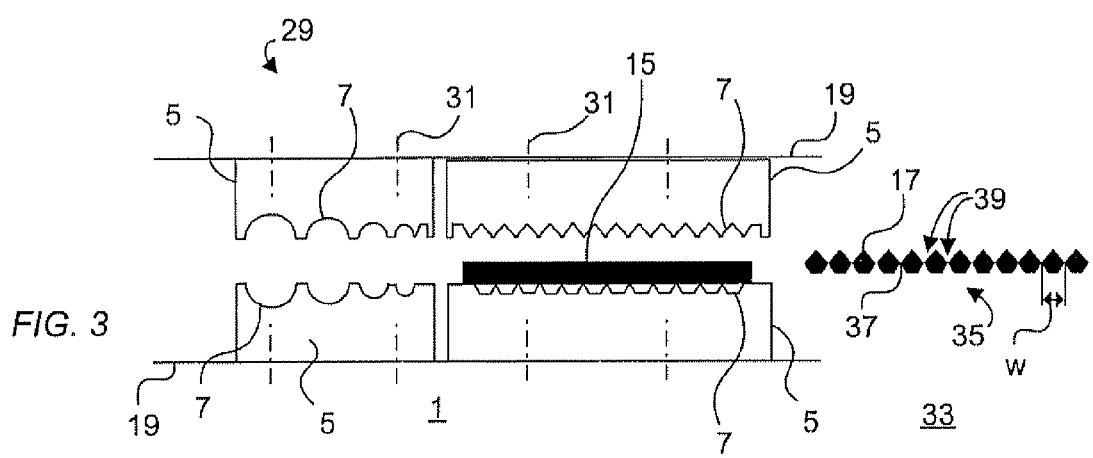
FIG. 3 schematically illustrates press beds of a forming device comprising a modular system according to a second embodiment.

FIG. 3 illustrates a forming device 1, which according to a second embodiment is adapted for mounting of a number of press beds 5 with different shaped grooves 7. The mounting is performed by means of mounting screws 31. A blank of base material 15 is placed onto one of the press beds 5. Since the blank of base material 15 can be formed at a temperature at approximately 20 C. and the room temperature of the work shop 33 is approximately 20° C., no heating means 11 is arranged in the forming means 29. A cake 35 with fillets 17 with a pentagonal profile is produced. The fillets 17 are joined (linked) together (by joints 37) via material of plastic between the fillets 17. This joining material of plastic is left between the outer corners 39 of the pentagonal profiles along the longitudinal direction of the fillets 17 after a completed compression.

Another type of a modular forming device 1 is illustrated in FIG. 4. A forming means 29 comprising a mounting table 41 adapted for mounting of various press beds 5 containing optional grooves 7 for forming fillets 17 with different profiles is arranged in the forming device 1. If a request of a new type of fillets 17 arises at short notice in the production, a new press bed 5 will be machined with suitable grooves 7 in a short time, and will replace the present press bed 5 according to arrow E. This fast alteration of production of fillets 17 is cost-effective and flexible. A fast alteration of the production line can be achieved by means of exchangeable press beds 5 according to this modular system.

In FIGS. 5a and 5b is shown a cutting device 43 locked in two illustrated adjustments. A cake 35 (see FIG. 3) comprising formed fillets 17, is separated by cutting the joints 37 with adjustable knife blades 45 displaceable mounted in the cutting device 43. The adjustment of the distance between the knife blades 45 depends upon the width w of the specific fillets 17 and is marked with a. Electrical motors (not shown) are coupled to spindles 47 in a housing 49, which electrical motors move the knife blades 45 according to the specific widths w of the fillets 17. The electrical motors are controlled by a control unit (not shown) programmable with data regarding the fillet measures. The cutting device 43 is movable over the lower press bed 5 in a controlled motion by means of a robot arm (not shown) acting in response to sensor (not shown) signals. The controlled motion of the cutting device 43 provides a cutting of the cake 35 into fillets 17.

FIG. 6 illustrates a reel cutter arrangement 51 for cutting the joints 37 of a cake 35. The reel cutter arrangement 51 comprises five reel cutters 53 lodged slide on a shaft 55. The shaft 55 is mounted in carriers 57 displaceable fastened to a robot arm (not shown). Distance sleeves 27 of different lengths are mounted on the shaft 55 between the reel cutters 53.

A cross-sectional portion of a structural element 59 adapted for an aircraft (not shown) is schematically illustrated in FIG. 7a. A cavity 61 exists between a panel 63 fastened to a supporting structure 65 of two assembled L-shaped ribs 67. This cavity 61 is to be filled with a fillet 17 of plastic for improving the strength of the structural element 59 before mounting the panel 63. A fillet 17 consisting of thermosetting plastic comprising reinforcement fibers 69 (arranged with their lengths in parallel with the longitudinal direction of the fillet 17) is placed in the cavity 61. The fibers 69 are more concentrated in the flattened portion of the fillets 17 caused by the compressing step. However, when heating and curing of the structural element 59 take place, fibers 69 will be reoriented in a homogeneous manner as shown in FIG. 7c. Also a hollow space 71 shown in FIG. 7b will be filled with thermosetting plastic of the fillet 17 during the heating of the structural element, as is shown in FIG. 7c. The profile 9 is determined by the shape of the cavity 61 of the structural element 59.

FIG. 8 shows a blank of base material 15 being covered on both sides by protective foils 73. The foils 73 prevent the compressed fillets to adhere to the press beds 5. Advantageously, the foils 73 are used as protection cover during transport of the prepreg tapes 72 (see A). After forming the fillet cake 35, the protective foils 73 still cover the material of plastic (see B). The cake 35 or band of fillets will be even more easily to handle. The fillets 17 can be cut away from the cake 35 one by one as desired, still maintaining foils 73 on the fillet's sides (see C). In case of removing the protective foils 73 from the cake 35, the removal of a fillet 17 can be made one by one by means of a cutting apart effect influencing the foils 73 to mechanically separate.

FIG. 9 illustrates a forming device 1 adapted for automatically mechanical separation of the fillets 17 from each other in connection with the fulfilled compressing step. The press beds 5 of the forming means 29 are provided with grooves 7 comprising edges 75, constituting a separating means 76 for mechanical separation of the fillets 17 from each other. The edges 75 are provided adjacent and along the length of the elongated grooves 7. The edges 75 are provided for separating the fillets 17 from each other by means of sharp edges 77. The forming means 29 comprises a control means (not shown) associated with a press bed driving means 23 connected to the press beds 5 for controllable movement of the compressing operation, for either moving towards or separating the press beds 5 from each other. The control means associated with the press bed driving means 23 is adjusted for controlling the both press beds 5 to come in contact with each other in a sufficient manner for separating the fillets 17 from each other. This adjustment is dependent on data, such as the thickness t of the prepreg tape 72, the material of the latter, the profile 9 of the fillets 17, number of fillets 17 in one compression step etc. The data is fed to the control means (a central processor unit and data terminal) controlling the press bed driving means 23.

As shown in FIG. 10 a forming device 1 comprises three press beds 5, of which one is called intermediate press bed 5" being placed between the upper 5 and the lower 5' press beds. The intermediate press 5" bed comprises of heating means 11 associated with a control means 79 for controllable heating of the two applied blanks of base material 15. The intermediate press bed 5" heats the upper and lower blank of base material 15 before the compression step. The blank of base material 15 is heated within the range of 20° C.-120° C., preferably 40° C.-100° C., depending upon the sort of plastic material.

The step of removing the compressed formed fillets 17 can be followed by a step of changing the three press beds 5, 5' and 5" to new press beds according to a modular system. Fastening of the new press beds 5 onto the press tables 81 of the forming means 29 is performed by means of clamps 83 of a fastening means 84. Bolts 82 are drawn for tightening the clamps 83.

The control means 79 (a CPU) is electrically connected to a driving means 85, which is an electrical motor 87. The motor 87 drives the upper press bed 5 in a direction towards and from the lower press bed 5' under influence of the CPU. A drive ring 89 is coupled to the motor 87, which drive ring 89 is carried by a support 91 and under rotation drives a column screw foundation 93 carrying the upper press table 81. Sensors (not shown) cooperate with the CPU for adjustment of the upper press bed 5.

The upper press bed 5 is moved towards the other press bed 5' for compression of the blank of base material 15 into fillets 17. The heating means 11 is also controllable by the CPU and heat is generated to the blank of base material 15 via the intermediate press bed 5" dependent on data previous fed into the CPU. Such data can be data regarding the thickness t of the prepreg tape, the material of the latter, the profile of the fillets 17, the number of fillets 17 in one compression step etc. When the press beds 5, 5' being in position for completed compression of the fillets 17, the edges 75 separate the fillets 17 from each other.

Thereafter, the press beds (5, 5') are separated from each other by means of the driving means 85 for releasing the formed fillet (17), wherein the formed fillet (17) are removed from the forming means (29).

The formed fillets 17 can then be applied in a cavity (61) being provided between the panel 63 fastened to the supporting structure 65 comprising two assembled L-shaped ribs 67.

When manufacture is performed in a work shop having a temperature of approximately 14-23° C., the blank of material automatically will be heated till the same temperature as the room temperature, which is necessary for forming the plastic material (thermoplast, thermosetting plastic etc.)

requiring this temperature for compression of the blank of plastic base material into a fillet.

Although particular embodiments have been disclosed herein in detail, this has been done for purposes of illustration only, and is not intended to be limiting with respect to the scope of the appended claims. The disclosed embodiments can also be combined. In particular, it is contemplated by the inventors that various substitutions, alterations, and modifications may be made to the invention without departing from the spirit and scope of the invention as defined by the claims. For instance, one groove can accommodate more than one fillet. The removal of the compressed fillets can be achieved by cooling the press beds either in place or transporting the press bed to a refrigerating chamber. The press bed can have a convex or concave or sinusoidal surface depending on application and can furthermore be designed of various materials. Various solutions for achieving a controllable movement of the press beds are possible. Sensors may stop the press bed motion in co-operation with the control unit. Furthermore, sections in the press beds may be built with different areas for generating different temperatures dependent on the type of fillets being compressed. Fastening means for detachable fastening the press beds can for example be screws, anchorage by bonds, screw clamps, etc. The separating means can comprise automatically controlled displaceable members of different kind of knives, punches, perforating members etc.

The invention claimed is:

1. A method of manufacture of fillets of prepreg material for aircraft assemblies, each fillet having a pre-determined profile for filling a cavity of a structural element, the fillets being formed using a former of a forming device, said method comprising:
   applying at least one blank of a base prepreg tape material between at least two opposed press beds of the former and at least one of said press beds comprising at least two adjacent elongated grooves and ridges between adjacent grooves, wherein the blank extends over the grooves and ridges;
   compressing the blank by moving at least one of the press beds towards another of the press beds, such that the ridges extend into the blank, until the press beds are in position for completed compression of the blank, wherein the grooves and ridges generate fillets and joints between the fillets in correspondence with said pre-determined profile;
   separating the press beds from each other for releasing the formed fillets;
   removing the formed fillets from the former;
   mechanically separating the fillets from each other along the joints;
   applying one of the formed fillets in the cavity after mechanically separating the fillets; and
   heating and curing the structural element and the fillet applied in the cavity of the structural element.

2. The method according to claim 1, further comprising:
   heating the blank of base material with a heater of the forming device.

3. The method according to claim 1, wherein the fillets are mechanically separated from each other during the compressing.

4. The method according to claim 1, further comprising:
   covering the blank of base material with protective foils.

5. The method according to claim 1, wherein the fillets are mechanically separated from each other after removing the formed fillets from the press bed.

6. The method according to claim 1, wherein the at least two elongated grooves all have an identical groove profile.

7. The method according to claim 1, wherein the at least two elongated grooves have groove profiles that are not identical.

8. The method according to claim 1, further comprising:
   changing at least one press bed to another press bed according to a modular system after removing the formed fillet from the former.

9. The method according to claim 1, wherein the press beds comprise a plurality of elongated grooves and the fillets are mechanically separated along at least one of the grooves.

10. A method of manufacture of fillets of prepreg material for aircraft assemblies, each fillet having a pre-determined profile for filling a cavity of a structural element, the fillets being formed using a former of a forming device, said method comprising:
   applying at least one blank of a base prepreg tape material between at least two opposed press beds of the former and at least one of said press beds comprising at least two adjacent elongated grooves and ridges between adjacent grooves, wherein the blank extends over the grooves and ridges;
   compressing the blank by moving at least one of the press beds towards another of the press beds, such that the ridges extend into the blank, until the press beds are in position for completed compression of the blank, wherein the grooves and ridges generate fillets and joints between the fillets in correspondence with said pre-determined profile, wherein the fillets are separated from each other along the joints during compressing the blank;
   separating the press beds from each other for releasing the formed fillets;
   removing the formed fillets from the former;
   applying one of the formed fillets in the cavity after mechanically separating the fillets; and
   heating and curing the structural element and the fillet applied in the cavity of the structural element.

* * * * *